US007673771B2

(12) United States Patent
Bedore et al.

(10) Patent No.: US 7,673,771 B2

(45) Date of Patent: Mar. 9, 2010

(54) APPARATUS FOR DISPENSING MEDICATIONS

(75) Inventors: William A. Bedore, Stilwell, KS (US); Edward J. Schifman, Leawood, KS (US)

(73) Assignee: Cerner Innovation, Inc., Overland Park, KS (US)

( * ) Notice: Subject to any disclaimer, the term of this patent is extended or adjusted under 35 U.S.C. 154(b) by 253 days.

(21) Appl. No.: 11/441,606

(22) Filed: May 26, 2006

(65) Prior Publication Data

US 2007/0187423 A1 Aug. 16, 2007

Related U.S. Application Data

(60) Provisional application No. 60/772,382, filed on Feb. 10, 2006.

(51) Int. Cl.
*B65G 59/00* (2006.01)

(52) U.S. Cl. .............................. 221/123; 221/1; 221/69

(58) Field of Classification Search ................. 221/123, 221/87, 88, 92, 93, 106, 113, 122, 129, 131, 221/134, 155, 186, 191, 193, 194, 195, 196, 221/255

See application file for complete search history.

(56) References Cited

U.S. PATENT DOCUMENTS 3,140,009 A * 7/1964 Wallace ......................... 221/2
3,709,404 A 1/1973 Dana
3,893,589 A * 7/1975 Mandell ..................... 221/123
4,267,942 A * 5/1981 Wick et al. ..................... 221/2
4,355,733 A * 10/1982 Schoenkopf et al. ........ 221/123
4,519,522 A * 5/1985 McElwee ..................... 221/13
4,546,901 A 10/1985 Buttarazzi
4,560,088 A * 12/1985 Tan ............................. 221/75
4,815,055 A * 3/1989 Fago, Jr. .................. 369/30.43
4,823,984 A * 4/1989 Ficken ......................... 221/96
4,937,690 A * 6/1990 Yamashita et al. ......... 360/92.1
5,206,814 A 4/1993 Cahlander et al.
5,253,782 A * 10/1993 Gates et al. ................... 221/15
5,261,208 A * 11/1993 Lockhart ..................... 53/398
5,277,534 A * 1/1994 Anderson et al. ........... 414/281
5,467,892 A 11/1995 Schlamp
5,984,509 A 11/1999 Scott
5,988,431 A 11/1999 Roe
6,006,946 A 12/1999 Williams et al.
6,230,927 B1 5/2001 Schoonen et al.
6,330,957 B1 * 12/2001 Bell-Greenstreet ............. 221/3
6,711,460 B1 3/2004 Reese
6,735,497 B2 * 5/2004 Wallace et al. .............. 700/231
6,892,941 B2 5/2005 Rosenblum
2003/0222091 A1 12/2003 Gerold et al.
2004/0040975 A1 3/2004 Hunter et al.

(Continued)

*Primary Examiner*—Gene Crawford
*Assistant Examiner*—Kelvin L Randall, Jr.
(74) *Attorney, Agent, or Firm*—Shook Hardy & Bacon LLP

(57) ABSTRACT

A medication dispenser provides automation to the steps of locating and acquiring unit-based doses of certain medications to be administered to a patient. The dispenser includes a frame and one or more cartridges that may be mounted onto the frame. A set of slots sized for holding unit-based doses of medication extend through a body portion of the cartridge. A movement device is also positioned relative to the frame and is configured to induce movement of selected unit-based medication doses out of associated slots in the cartridge, so that the dispensed doses may be retrieved.

25 Claims, 10 Drawing Sheets

U.S. PATENT DOCUMENTS

2005/0000974 A1 1/2005 Chirnomas
2006/0259195 A1 * 11/2006 Eliuk et al. ................ 700/245
2007/0000937 A1 * 1/2007 Hunter et al. ................ 221/92
2008/0006647 A1 * 1/2008 Hunter et al. ................. 221/1

* cited by examiner

APPARATUS FOR DISPENSING MEDICATIONS

CROSS-REFERENCE TO RELATED APPLICATIONS

This application claims priority to commonly owned U.S. provisional application Ser. No. 60/772,382, filed Feb. 10, 2006, incorporated by reference in its entirety.

STATEMENT REGARDING FEDERALLY SPONSORED RESEARCH OR DEVELOPMENT

Not applicable.

BACKGROUND OF THE INVENTION

As reported by the Institute of Medicine, an estimated 106,000 deaths occurred in 1994 due to adverse drug reactions (ADRs), and more than 2,000,000 hospitalized patients experienced serious, if not fatal, ADRs. Lazarou J. et al., *Incidence of adverse drug reactions in hospitalized patients: a meta-analysis of prospective studies*, J. Am. Med. Assn. 1998: 279: 1200-1205. Many of these errors are attributable to the systems and methods used to store and deliver medications to those clinicians providing care to patients. Various solutions have been proposed to address the issue of medication delivery errors. For instance, computerized systems ensure that the medication ordered or prescribed by the clinician is clinically appropriate. These systems may verify that the dosage is proper based on patient information such as weight and evidence based guidelines or protocols. Also, these systems may perform interaction checking against other medications. However, even if the clinician orders an acceptable medication and dosage amount for a specific patient, the actual drug and/or dosage administered to the patient may vary from what was requested. A pharmacist or other clinician may accidentally provide an improper drug or drug dosage if the order is not properly communicated and followed at each step in the clinical process. For example, errors are encountered when a clinician has to perform the steps of (a) reading a request for a particular drug and drug dosage for a given patient, (b) retrieving the drug at the proper dosage while remaining cognizant of which patient is to receive the drug, and (c) placing the retrieved drug in an approved container or package so that it may be identified by the administering clinician. In addition to medication errors, existing systems and methods are wasteful and oftentimes difficult to use.

SUMMARY OF THE INVENTION

Improvements in delivery methods for unit-based doses of medications may be achieved through the automated dispenser of the present invention. In one aspect, the dispenser includes a frame and one or more cartridges adapted to be releasably mounted onto the frame. Each of the cartridges has slots extending through a body portion of the cartridge, with the slots sized for holding unit-based medications. The dispenser also includes a device positionable relative to the cartridges for inducing movement of selected unit-based medications from associated slots in the cartridge.

In embodiments, the frame may be supported by a base that enables rotation of the frame and thus cartridges releasably mounted with the frame. More specifically, a turntable motor may be coupled with the base, which provides a rotational output to align a specific cartridge with a device inducing medication movement from the cartridge. In this way, the turntable motor and device provide coordinated positioning of an effector that provides a force input into the associated cartridge slot for selected medication dispensing.

In another aspect, the dispenser includes one or more slotted cartridges adapted to be releasably mounted onto a frame, each cartridge having a plurality of slots arranged in a grid pattern. Also provided are a first device for inducing movement of selected medications from associated slots in the cartridges and a second device for aligning the first device with a particular cartridge. The first device is positioned to be at least partially surrounded by the frame, and includes at least one effector and a motor system supporting and positioning the at least one effector adjacent to an associated slot or group of slots in one cartridge that holds a selected unit-based medication to be dispensed. The motor system positions the at least one effector along at least one coordinate system axis (e.g., a vertical y-axis) in association with the second device rotationally aligning the cartridge holding the selected unit-based medication with the effector. A turntable motor forms the second device, which rotates the frame and cartridges relative to the effector of the first device.

A method of automated dispensing of unit-based medications is provided in another aspect of the invention. An input is received regarding a particular unit-based medication to be dispensed. A container having a plurality of slots extending therethrough is aligned with an effector in response to the input. Such alignment positions the effector relative to a slot of the container holding the unit-based medication to be dispensed. The effector then imparts a force on the particular unit-based medication located within the associated slot to move the dose from the container so that it may be retrieved. Each unit-based medication may be individually packaged with an associated identification marking so that it may be verified before the medication is administered to a patient.

The automated dispenser eliminates the errors associated with communicating orders to the clinician administering the medication. It also reduces the human interactions required to handle the medications. Not only are efficiencies gained by automating this process, but the tendency for human error in the medication delivery process is reduced as well. Additional advantages and features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWINGS

In the accompanying drawings, which form a part of the specification and are to be read in conjunction therewith and in which like reference numerals are employed to indicate like parts in the various views.

DETAILED DESCRIPTION OF THE INVENTION

Figure 1:
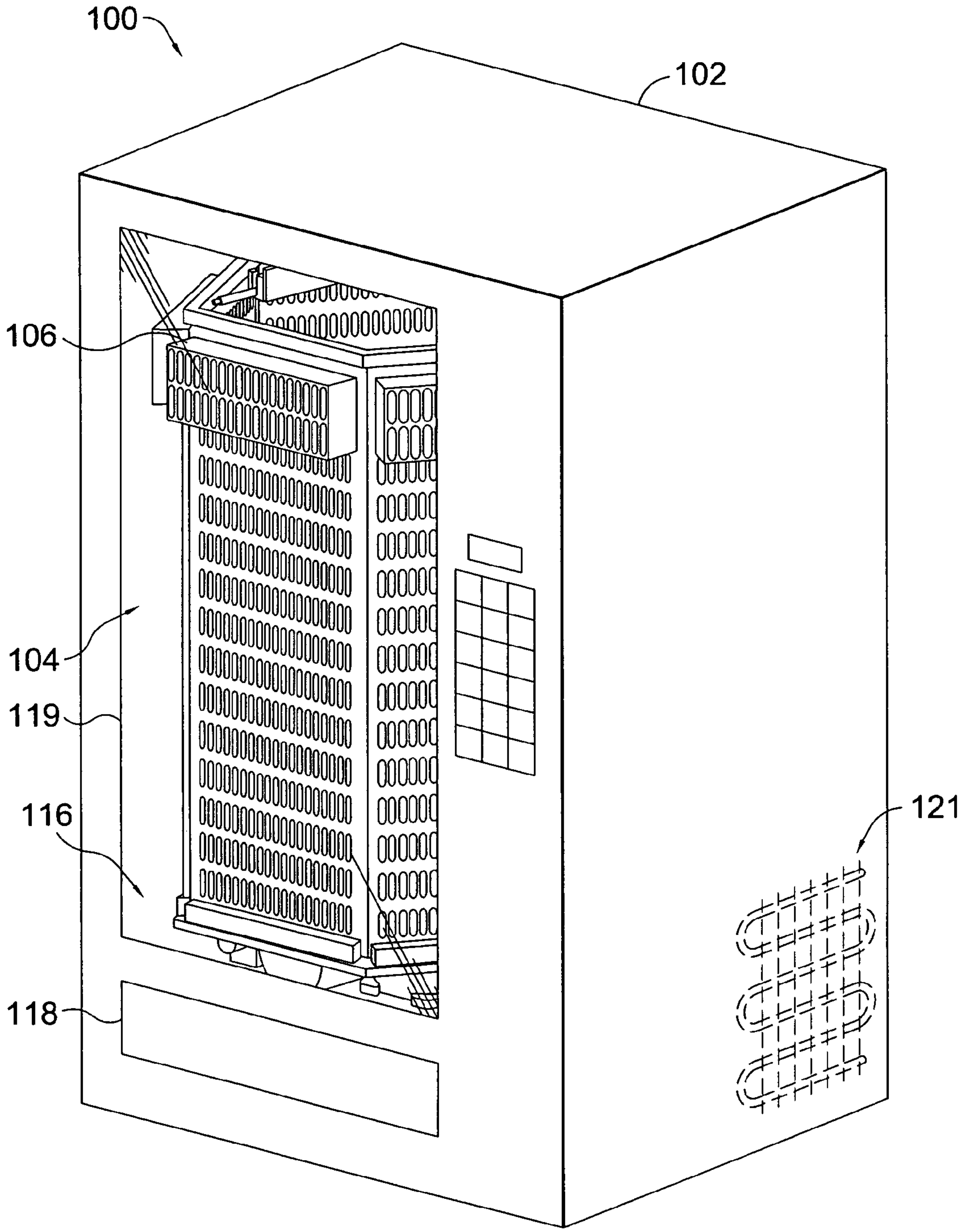
FIG. 1 is a perspective view of an embodiment of the automated unit-based medication dispenser.
Figure 2:
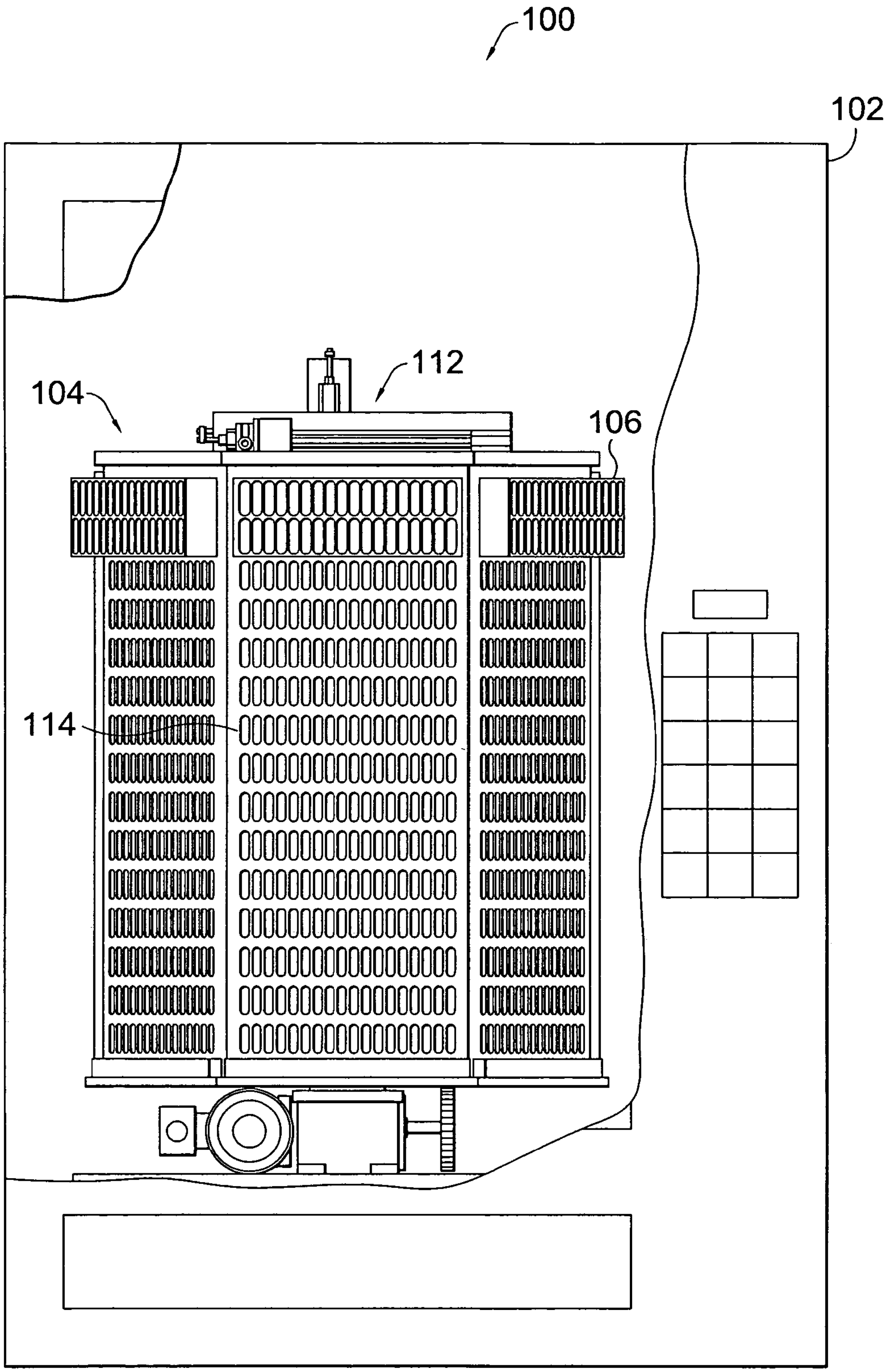
FIG. 2 is a fragmentary front elevational view of the automated unit-based medication dispenser of FIG. 1 with a portion of the surrounding enclosure broken away to show the other elements of the medication dispenser.
Figure 5:
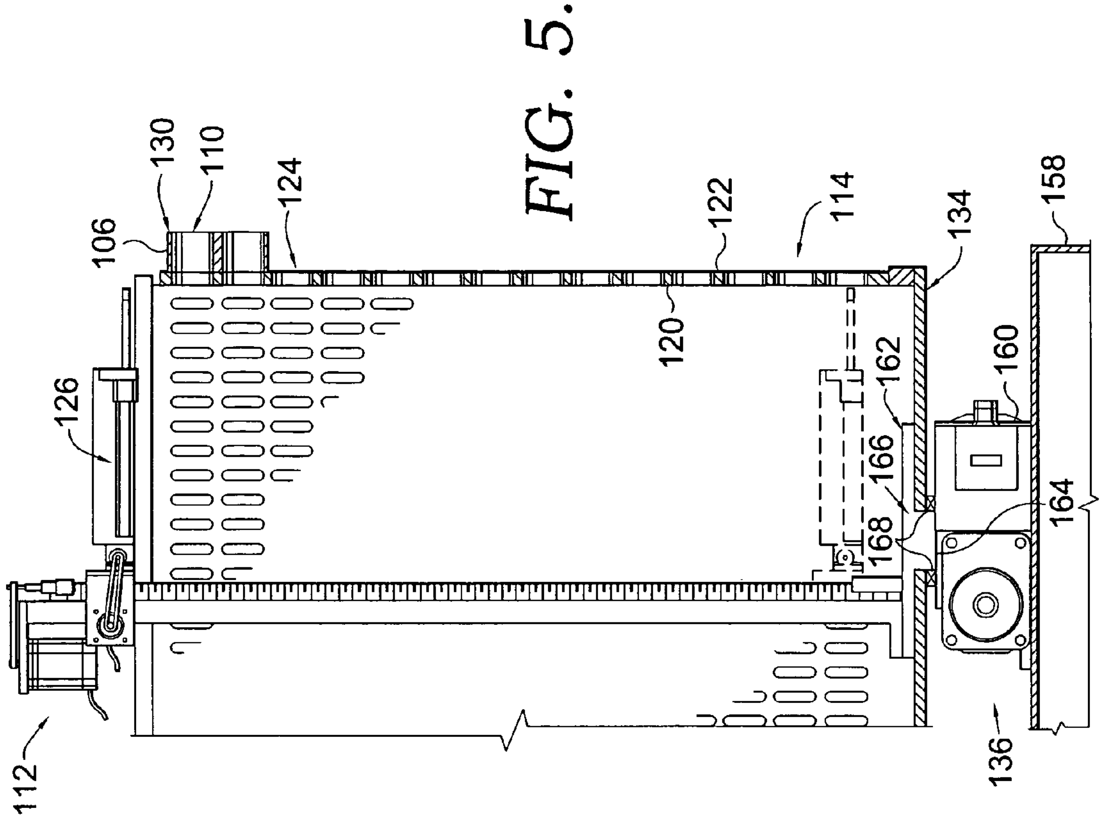
FIG. 5 is a vertical cross-sectional view taken along line 5-5 of FIG. 3 showing the vertical positioning of the effector relative to the slotted cartridges.
Figure 3:
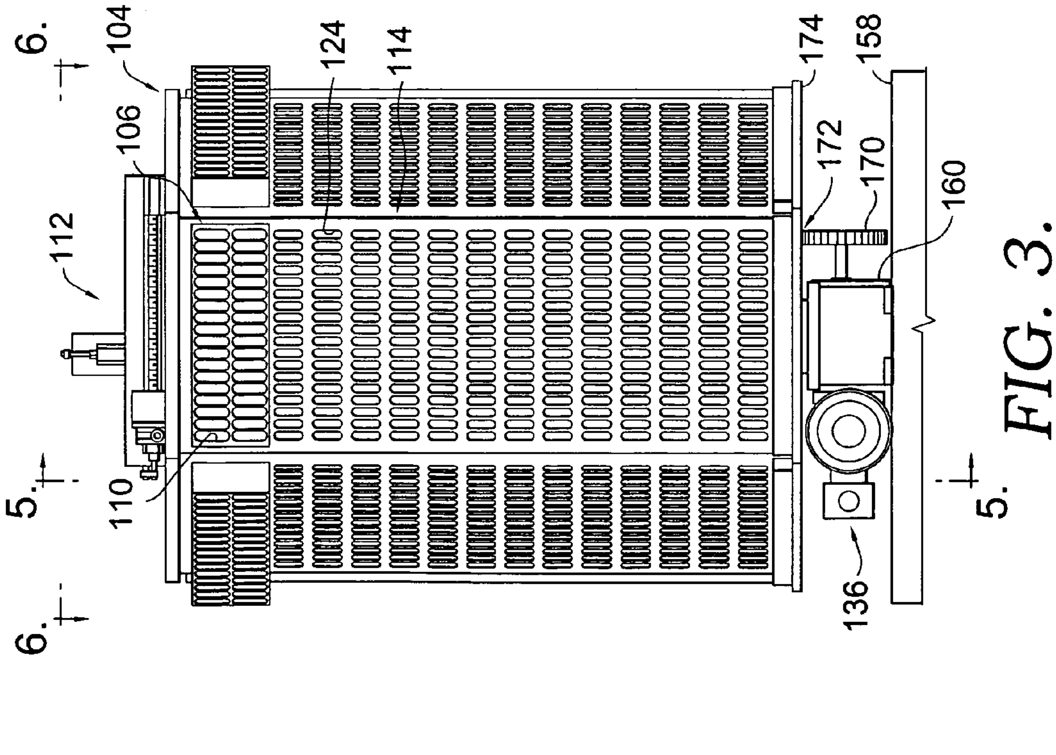
FIG. 3 is a front elevational view of the automated unit-based medication dispenser of FIG. 1 with the enclosure removed.
Figure 4:
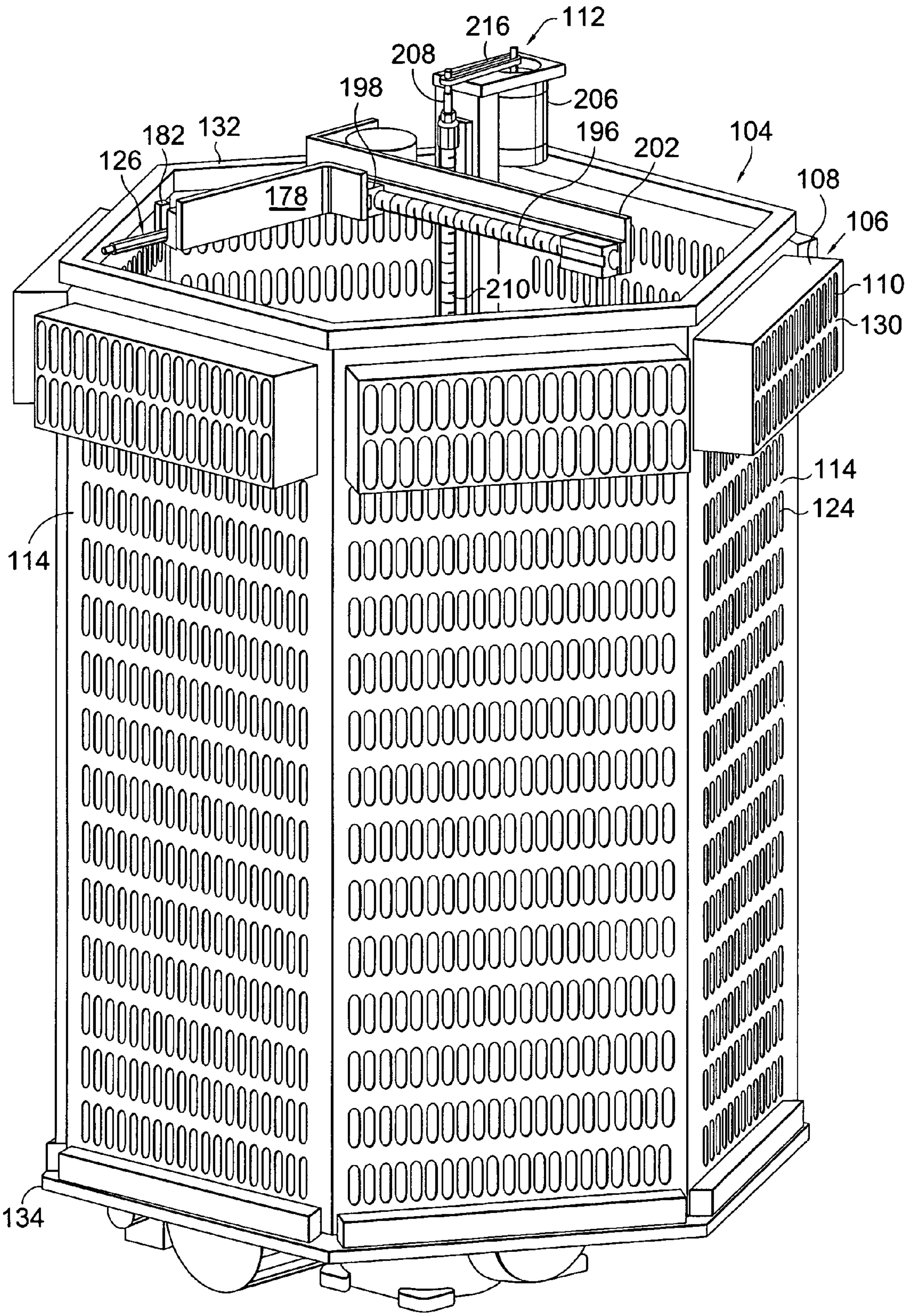
FIG. 4 is a perspective view of the automated unit-based medication dispenser of FIG. 1 with the enclosure removed.
Figure 6:
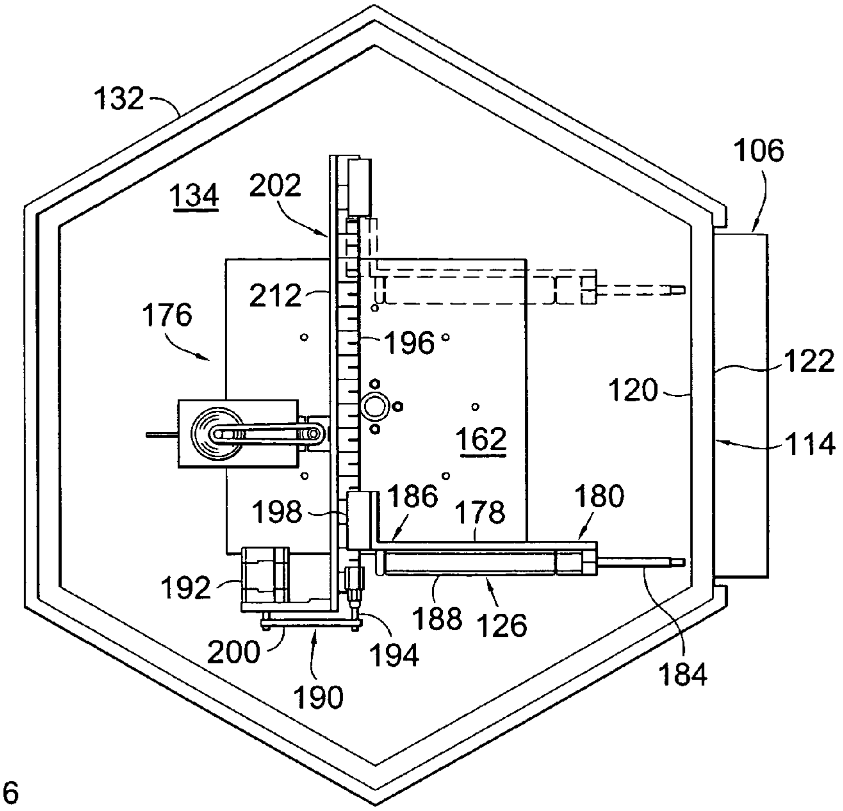
FIG. 6 is a top plan view taken along line 6-6 of FIG. 3 showing the horizontal positioning of the effector relative to the slotted cartridges.

An automated unit-based medication dispenser 100 in accordance with one embodiment of the present invention is shown generally in FIGS. 1-6. An enclosure 102 surrounds other components of the dispenser 100, as depicted in FIGS. 1 and 2. More specifically, the enclosure 102 encases a frame 104 supporting cartridges 106 that may be removably mounted to the frame 104. Each cartridge 106 has a body portion 108 (FIG. 4) with a plurality of slots 110 extending laterally therethrough. The slots 110 are each sized for holding a unit-based medication. In embodiments, each slot fully defines a cavity with a continuous perimeter in which the medication resides. In other embodiments, the slots may hold the medication at one or both ends of the medication rather than fully formed cavity. A number of different dosages and forms of the same medication may be located within the cartridges of the dispenser. As described more fully below, a device 112 for inducing movement of unit-based medications from the cartridges is generally surrounded by panel sections 114 of the frame 104 and positionable relative to any cartridge 106 mounted onto the panel sections 114. Once located in the proper position, the device 112 imparts a force on a selected unit-dose medication within the associated slot 110 of the cartridge 106 to move the unit-dose from the cartridge 106. The medication then falls into a receiving area 116 of the enclosure 102, where it may be retrieved through an access door 118. Additionally, a barrier window 119 may be formed in the enclosure 102 so that dispensing activity may be visually monitored, and an observation of the medications within certain cartridges 106 may be made for taking inventory or other purposes. In other embodiments, the window is not included so that the enclosure prevents the viewing of the medications in the device.

The enclosure 102 provides a controlled environment in which the medications are housed. In an embodiment, a refrigeration unit 121 may be coupled with the enclosure 102 to control the temperature and humidity level within the enclosure, which is desirable to avoid spoilage of certain types of medications. Additionally, the enclosure 102 regulates access to the medications, such that only those medications that have been dispensed from the cartridges 106 may be removed from the enclosure 102. The medication ordering information may therefore be used to account for the actual quantity and types of unit-based medications that have been made available for retrieval from the dispenser 100. This facilitates auditing of access activities, as well as providing a record for proper capturing a charge to facilitate payment for the medication.

Figure 9:
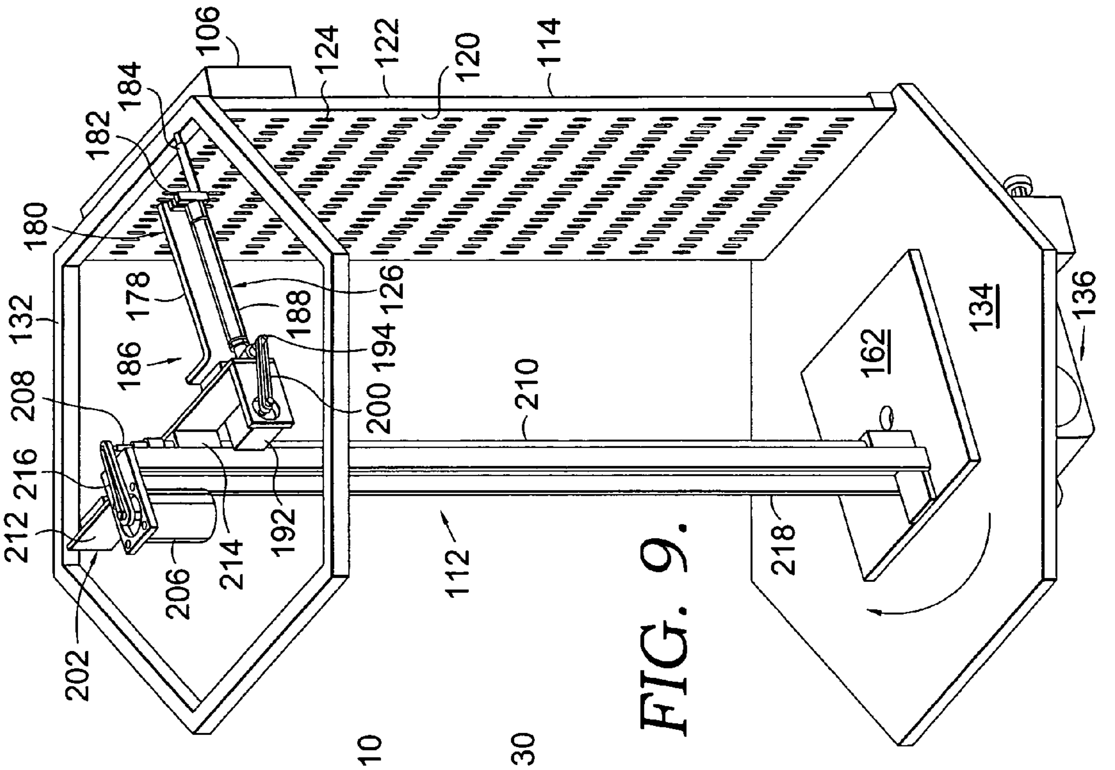
FIG. 9 is a perspective view of the automated unit-based medication dispenser of FIG. 1 with certain panel sections and the enclosure removed to show the rotation of the base and panel section of the frame relative to the device inducing medication movement from the cartridges with a number of panel sections removed to show the operation of the device for inducing movement of medication from the cartridges.

Turning in particular to FIGS. 3-6, the panel sections 114 are generally planar and each have opposed first and second surfaces 120, 122 with a set of slots 124 extending between the surfaces 120 and 122. The slots 124 of the panel sections 114 are configured to align with the slots 110 of the cartridges 106 when one of the cartridges 106 is mounted onto the second surface 122 of one of the panel sections 114. The panel sections 114 are connected with one another by an upper rim 132 and are supported by a base 134. The base 134 preferably takes the form of a turntable driven by a turntable motor 136. In this configuration, rotation of the base 134 by the turntable motor 136 positions the appropriate panel section 114 upon which is mounted the cartridge 106 housing the particular unit-based medication 128 in alignment with an effector 126 of device 112, as depicted in FIG. 9. The effector 126 faces the panel section first surface 120 and applies force to a particular unit-based medication 128 disposed in the associated slot 110 to move the medication from the slot 110 through a front surface 130 of the cartridge 106, as can be seen in FIG. 7.

Figure 7:
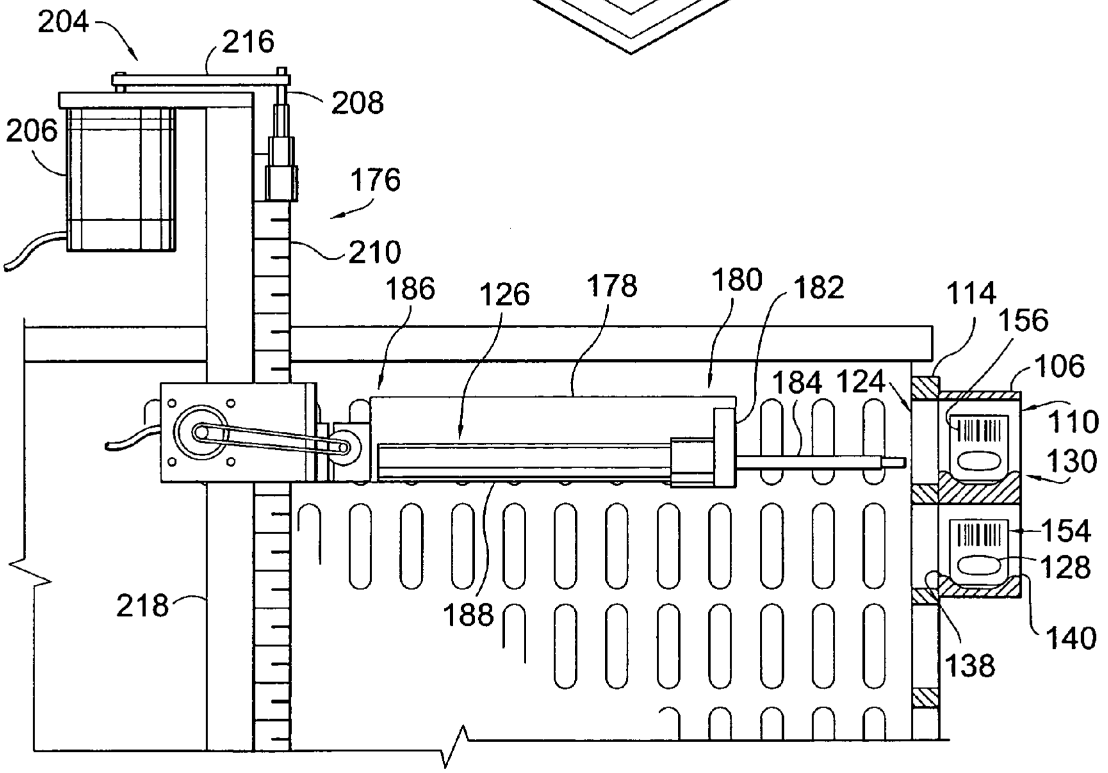
FIG. 7 is a fragmentary side elevational view of the automated unit-based medication dispenser of FIG. 1, partially in section, showing the effector oriented to induce movement of a medication from a slot in a cartridge.
Figure 8:
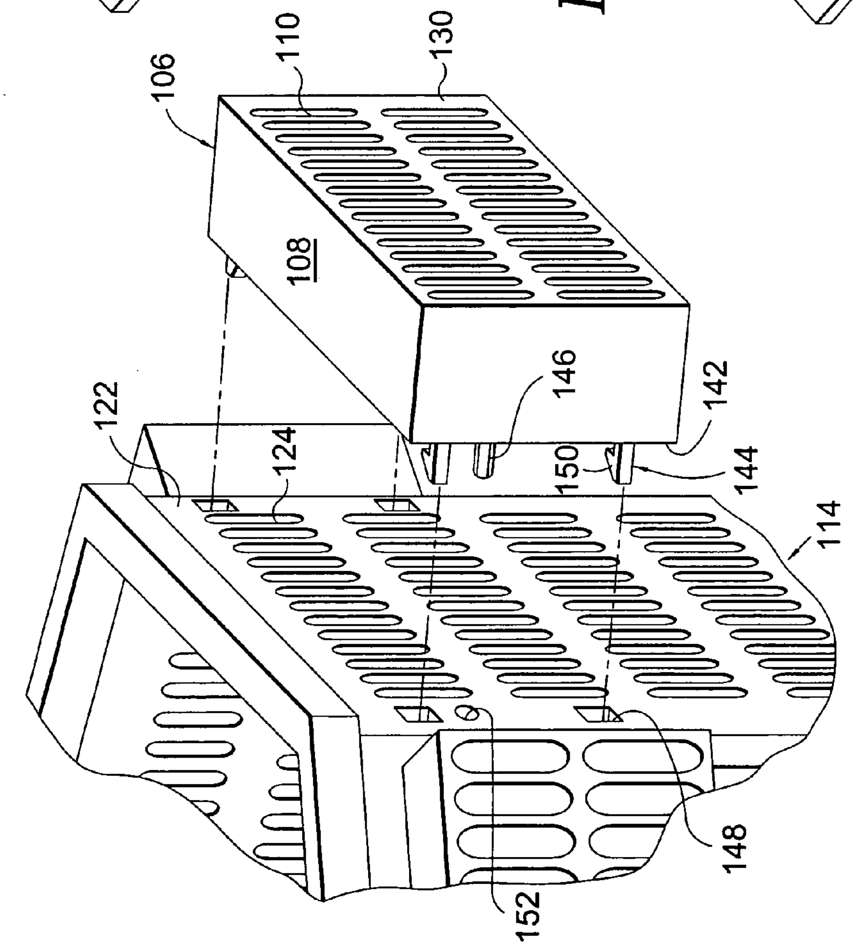
FIG. 8 is a fragmentary perspective view showing one of the slotted cartridges moving into engagement with one of the panel sections.

In an embodiment, the slots 124 of the panel sections 114 and the slots 110 of the cartridges 106 have a matching configuration, as shown in detail in FIG. 8. For instance, each may have an oval shaped cross-section. The size of the panel section slots 124 are sufficient to enable the effector 126 to impart the necessary force therethrough to move the unit-based medications 128 from the associated cartridge slot 110. The cartridge slots 110 may also have forward and rearward raised rim sections 138 and 140, as shown in FIG. 7, to reduce the occurrence of unit-based medications 128 inadvertently falling from the slots 110 due to, for example, the rotational force applied to the base 134 and panel sections 114 by the turntable motor 136. It should be understood that the specific slot configuration for the panel sections 114 and the cartridges 106 are exemplary, as are other components of the device. The dispenser 100 may have one panel section 114, or any number of panel sections 114, or no panel sections 114 whatsoever, as will be explained below with reference to other embodiments. Additionally, the panel sections 114 may be sized to have one cartridge 106 or any number of cartridges 106 mounted therewith. The cartridges 106 and panel sections 114 may also have any number of rows and columns of slots 110 and 124, respectively. Alternatively, the slots 110 and 124 may be arranged in any other grid pattern besides the row and column format, including, as one example, other two-dimensional array slot configurations.

The cartridge slots 110 may be preloaded with designated unit-based medications 128 suitable for automatic dispensing. An adhesive barrier sheet (not illustrated) may be secured to each respective surface 130, 142 of cartridge 106 to maintain the medications 128 in the respective slots 110 between the time the cartridge 106 is preloaded with medications and when it is removably mounted onto the one of the panel sections 114 for dispensing activity. The rear surface 142 also has a set of attachment prongs 144 and a boss 146, as shown in FIG. 8. The prongs 144 slide into receiving holes 148 extending through the panel sections 114, and each have a hook 150 for abutting a portion of the panel first surface 120 adjacent to the respective receiving hole 148. Thus, the prongs 144 and receiving holes 148 cooperatively secure the cartridges 106 onto the panel sections 114 while aligning the panel section slots 124 with the cartridge slots 110. The resilient nature of the prongs 114 allows for their bending to release the hooks 150 from engagement with the panel first surface 120 and removal of the cartridge 106 from the panel section 114. In this way, the cartridge 106 may be discarded when all of the unit-based medications 128 have been dispensed, or alternatively refilled with new unit-based medications 128 and reattached with the panel section 114. The boss 146 ensures that the cartridges 106 may not be rotationally inverted when mounted on the panel sections 114 by fitting into a mating recess 152 on the panel second surface 122. The prevention of cartridge inversion ensures proper slot locations if the cartridges are preloaded with unique unit-based medications 128. In an embodiment, a computer system will store the location (i.e. "Panel 1, Row 2, Column 5) of the medication in the device. If the cartridge is located on the proper panel in the proper orientation, then the device 112 may be selective control to dispense the proper medication. However, if the cartridge was allowed to be inverted, the slot locations will not be aligned with the panel sections and the incorrect medications may be administered. Likewise, ensure that the proper panel and row may be ensured by positive identification of the cartridge and the location by used of bar codes or RFID tags, as discussed in more detail below.

Each unit-based medication 128 may be placed in an individual package 154 with an identification marking, such as a bar code 156, formed onto the package 154, as shown in FIG. 7. The bar code 156 provides an added level of safety at the time the unit-based medication is loaded and dispensed from the dispenser, and when the dose is administered to a patient. The person removing the package 154 from the dispenser 100 can scan the bar code 156 with a bar code reading device to determine if the unit-based medication 128 dispensed matches the specific unit-based medication requested by the clinician. Additionally, the clinician administering the dispensed unit-based medication to the patient can scan the bar code 156 to be sure the patient will actually receive the specific medication requested by the clinician.

As previously described, the turntable motor 136 drives rotation of the base 134. This movement serves to rotationally align the effector 126 with a specific panel section 114 upon which is mounted the corresponding cartridge 106 housing the preselected unit-based medications 128. The turntable motor 136 is mounted onto a platform 158 and has a housing 160 that supports the frame 104 and the device 112 inducing medication movement from the cartridge. More specifically, a base 162 of the device 112 has a lower portion 164 extending through an opening 166 in the base 134 of the frame 104 and mounted directly onto the turntable motor housing 160. An annular bearing set 168 supports the base 134 of the frame 104 in rotation on top of the turntable motor housing 160. The output of the turntable motor 136 includes a gear 170 rotating on an axis parallel with the plane of the frame base 134. The gear 170 engages with an annular track 172 formed on a bottom surface 174 of the base 134 to drive rotation of the frame 104 relative to the turntable motor housing 160 and thus the position of the panel sections 114 relative to the effector 126.

In an alternative embodiment, the rotating output of the turntable motor 136 may extend upwardly to connect with the base 162 of the device 112 inducing medication movement, and the frame base 134 may be rigidly affixed onto the turntable motor housing 160. Thus, the device 112 would be rotatable with respect to the stationary frame 104 in providing general rotational alignment between a designated panel section 114 and the effector 126.

The specific features of the device 112 inducing movement of unit-based medications from the dispenser 100 are best illustrated in FIGS. 4-7 and 9. Once the turntable motor 136 rotationally aligns a designated panel sections 114 with the effector 126, the device 112 precisely positions the effector 126 at the proper x-y coordinates for inducing movement of the preselected unit-based medication 128 from the associated slot 110 of the cartridge 106. The portion of the device 112 that positions the effector 126 relative to a specific slot 124 of the designated panel section 114 aligned with the cartridge slot 110 holding the preselected unit-based medication 128 may be referred to herein as an x-y motor system 176.

A first support 178 of the x-y motor system 176 has a front end 180 presenting a channel-forming member 182 that receives a free end 184 of the effector 126 therein. The first support 178 also has a back end 186 to which a body portion 188 of the effector 126 is mounted. A horizontal linear movement component 190 of the x-y motor system 176 includes a first servo motor 192 having an output coupled with a lead screw 194 rotatable within a sleeve 196 to drive linear motion of the first support 178 and the effector 126. The first support back end 186 has a block follower 198 that slidably mounts onto the sleeve 196 and engages with the lead screw 194 so that turning of the lead screw by the first servo motor 192 moves the effector 126 along the horizontal x-axis to the specific column in which the designated slot 124 is located. The first servo motor 192 output reaches the lead screw 194 through a drive belt 200. A second support 202 provides a rigid structure upon which the first servo motor 192 and the sleeve 196 are mounted, thereby supporting the first support 178 and effector 126. A vertical linear movement component 204 of the x-y motor system 176 includes a second servo motor 206 having an output coupled with a lead screw 208 rotatable within a sleeve 210 to drive linear motion of the second support 202. The second support 202 has a back side 212 upon which a block follower 214 is mounted. The block follower 214 is slidably mounted onto the sleeve 210 and engages with the lead screw 208 so that turning of the lead screw 208 by the second servo motor 206 moves the second support 202 along the vertical y-axis, thereby positioning the effector 126 at the specific row position for the designated slot 124. The second servo motor 206 output reaches the lead screw 208 through a drive belt 216. A support tower 218 extending upwardly from the base 162 of the device 112 provides a rigid structure upon which the second servo motor 206 and the sleeve 210 are mounted, thereby supporting the second support 202, the horizontal linear movement component 190, the first support 178 and the effector 126. Therefore, the components of the x-y motor system 176 align the effector 126 with the specific row and column position for the panel section slot 124 that corresponds with the cartridge slot 110 holding the preselected unit-based medication 128 to be dispensed.

The effector 126, in one embodiment, is a pressurized air director formed with an internal conduit connected with a pressurized air supply (e.g., an air compressor). The effector free end 184, therefore, directs a flow of air towards a designated panel section slot 124 to reach the preselected unit-based medication 128 disposed in the associated cartridge slot 110, as seen in FIG. 7. The force applied by the flow of air from the effector 126 is sufficient to propel the unit-based medication 128 (e.g., in the package 154) over the forward lip 140 of the cartridge slot 110, so that the medication 128 can fall to the receiving area 116 of the enclosure 102 for retrieval. In an embodiment, the air flow direction from the effector 126 induces movement of the unit-based medications 128 out of the cartridge slots 110 by first aligning the effector free end 184 for directing an air stream into an upper portion of the designated slot 110, and then moving the free end 184 vertically downward (e.g., by the second servo motor 206 turning the lead screw 208) as the air stream is directed longitudinally through the slot 110. The downward sweeping motion of the air stream created by moving the effector free end 184 vertically downward effectively pushes the unit-based medication 128 from the slot 110. However, other effector free end 184 positioning and air flow directing may be implemented to accomplish unit-based medication dispensing from the cartridges 106.

It can be understood by those of skill in the art that the effector 126 may produce a different type of force incident upon the unit-based medication 128 in one of the cartridge slots 110 to effect dispending. For instance, the effector 126 may be formed as a pneumatic or hydraulic cylinder with the free end 184 serving as a movable piston extendable into the cartridge slot 110 to push the preselected unit-based medication 128 out of the cartridge 106.

To direct the movement activities of the device 112 and turntable motor 136, electronic controls may be coupled with the x-y motor system 176 and the turntable motor 136. The electronic controls, in one embodiment, include circuitry, such as a microprocessor, microcontroller or application-specific integrated circuit, along with associated memory storing embedded software, for handling the receiving of input signals and generating, in response command signals directing the activity of the x-y motor system 176 and the turntable motor 136. For instance, the input signals may be associated with the particular unit-based medication 128 requested to be dispensed. More specifically, the input signals may identify a particular unit-based medication 128 requested, and the electronic controls may lookup in a database the particular cartridge slot 110 location (associated with a specific slot 124 of one of the panel sections 114) that is associated with the medication 128. Alternatively, the input signals may already be formatted to designate the particular cartridge slot 110 location. In either case, the electronic controls generate command signals based on the input signals that cause (a) the turntable motor 136 to rotate the frame base 134 and thereby generally align the particular panel section 114 to which is mounted the specified cartridge 106 housing the preselected unit-based medication 128 with the effector 126, and (b) the x-y motor system 176 to position the effector 126 at the proper row and column position of the panel section slots 124 to effect movement of the preselected unit-based medication 128 from the associated cartridge slot 110.

Figure 10:
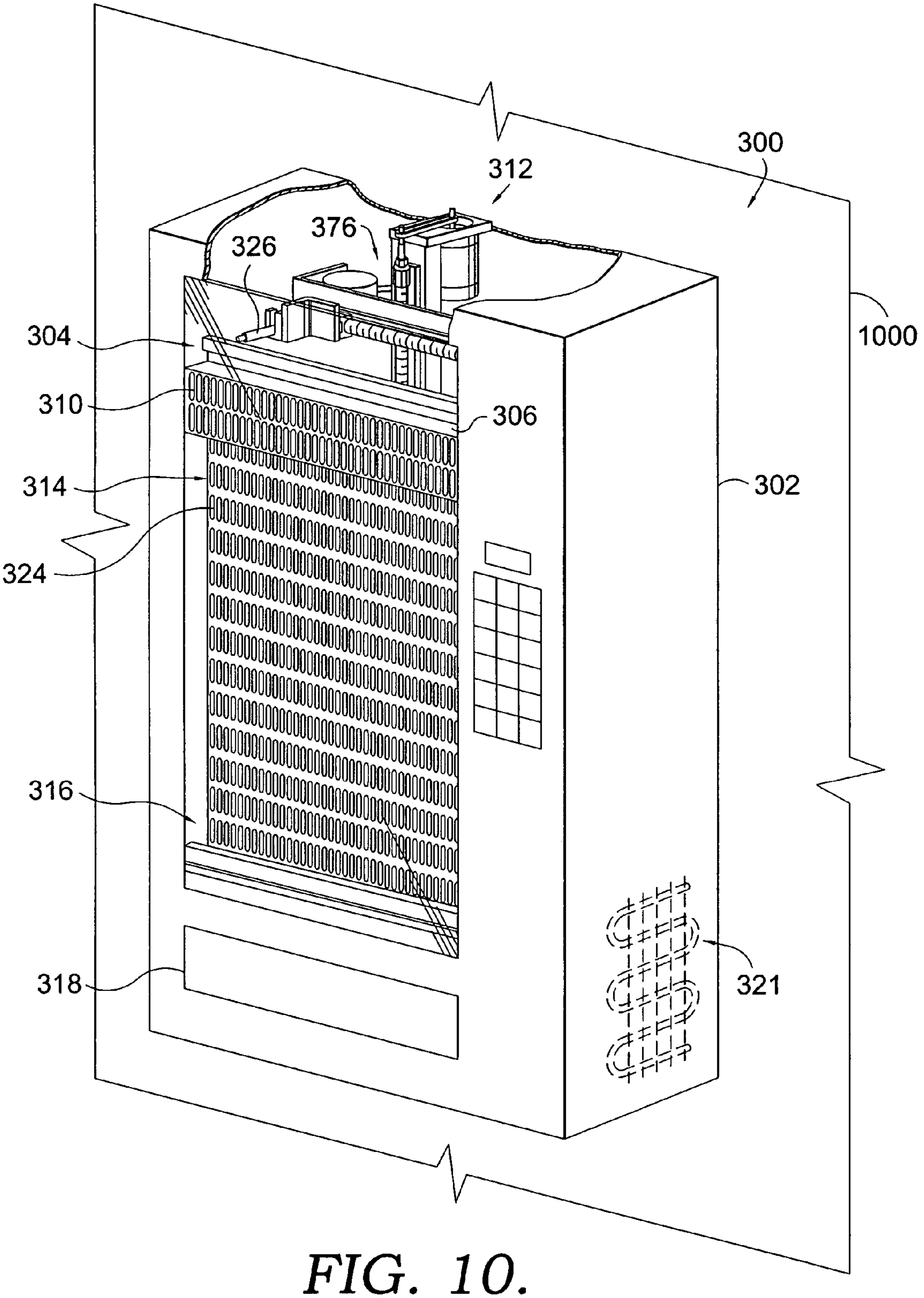
FIG. 10 is a fragmentary perspective view of another embodiment of the automated unit-based medication dispenser with a portion of the surrounding enclosure broken away to show the other elements of the medication dispenser.

Another embodiment of an automated unit-based medication dispenser 300 is depicted in FIG. 10. The dispenser 300 may be provided with many of the same features as the embodiment of the dispenser 100 illustrated in FIGS. 1-9. The dispenser 300 includes an enclosure 302 that may be configured for mounting onto a wall 1000, so that the dispenser 300 may be utilized in locations where floor space is needed for other uses. The enclosure 302 includes a receiving area 316, an access door 318, and an optional refrigeration unit 121. A movement device 312 of the dispenser 300 includes an effector 326 and an x-y motor system 376 preferably having the same components as the x-y motor system 176 of the dispenser 100. A frame 304 supports unit-based medication holding cartridges 306, and generally is formed as at least one panel section 314 extending in a single spatial plane. The cartridges 306 and each individual panel section 314, therefore, may be the same as the cartridge 106 and one of the panel sections 314 of the dispenser 100. As such, dispensing activity for a particular unit-based medication is dependent upon the x-y motor system 376 positioning the effector 326 at the proper row and column position of a slot 324 of the panel section 314 associated with a slot 310 of the cartridge 306 housing the preselected unit-based medication to effect movement thereof out of the associated cartridge slot 310. Because the at least one panel section 314 extends in the x-y plane and does not surround the movement device 312, the turntable motor 136 is not needed for general alignment between the panel section 314 and the effector 326.

Figure 11:
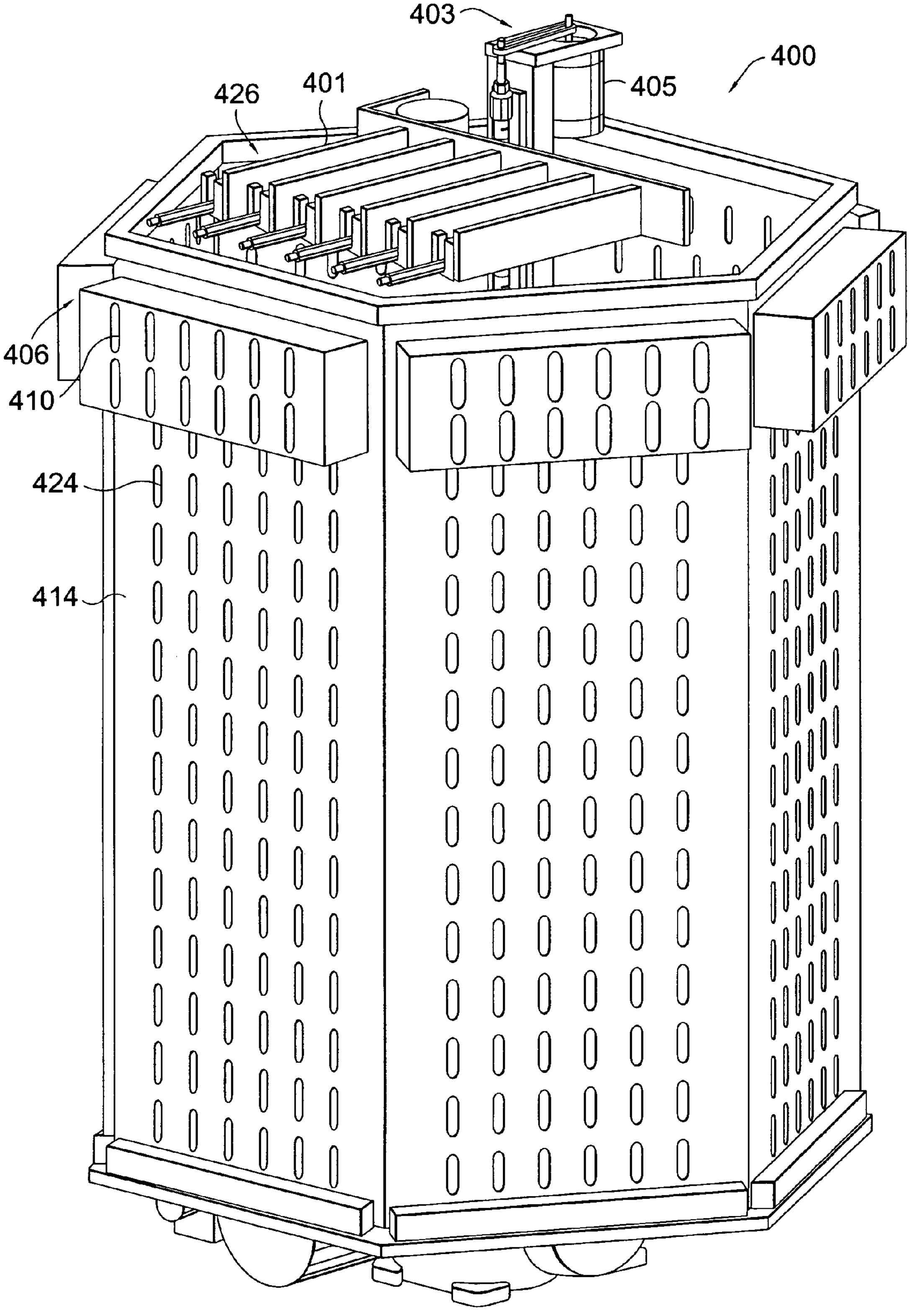
FIG. 11 is a perspective view of yet another embodiment of the automated unit-based medication dispenser with the enclosure removed to show multiple effectors laterally aligned in a row.

With reference to FIG. 11, yet another embodiment of an automated unit-based medication dispenser 400 is depicted. The dispenser 400 shares the same components with the embodiment of the dispenser 100 illustrated in FIGS. 1-9, except that the effector 126 is replaced with a plurality of effectors 426, preferably one effector 426 for each column position of slots 424 of a given panel section 414 of the set of panel sections 414. Additionally, because x-axis positioning of one effector 426 is not needed, the horizontal linear movement component 190 is not implemented in the dispenser 400. A set of supports 401, similar to the second support 202 of the dispenser 100, provide rigid structures upon which the plurality of effectors 426 are mounted. A vertical linear movement component 403 drives linear motion of the supports 401 in the vertical or y-axis, thereby positioning the plurality of effectors 426 adjacent to the proper slot row where the preselected unit-based medication to be dispensed is located. Instead of the electronic controls being electrically connected with the x-y motor system 176, the electronic controls are electrically connected with a vertical driving servo motor 405 and the pressurized air supply that provides pressurized air to the effectors 426. The electronic controls may thereby regulate air flow out of the effectors 426 to only permit the effector 426 adjacent to a slot 410 of a cartridge 406 housing the preselected unit-based medication 128 to provide forcible air flow directed towards the associated panel section 414. Additionally, as with embodiment of the dispenser 100 illustrated in FIGS. 1-9, the turntable motor 136 may rotationally position the cartridges 406 and particular panel section 414 relative to the vertical linear movement component 403 and thus the plurality of effectors 426.

The frame 104 of the dispenser 100 may also be adapted so that the panel sections 114 are not needed for removably mounting the cartridges 106 with the frame 104. In an embodiment depicted in FIGS. 12 and 13, the frame 104 includes a set of rails 220 spanning vertically between the upper rim 132 and the base 134. Each rail 220 has a set of faces 222 with at least some of the faces 222 being formed with a plurality of bores 224. More specifically, each face 222 of one rail 220 that is aligned with a face 222 of an adjacent rail 220 includes bores 224. Seated within each bore 224 is a compression spring 226 and a locking pin 228. The compression spring 226 biases the locking pin 228 outwardly from the bore 224 for engagement with a cartridge 106. More specifically, the embodiment of the cartridge 106 illustrated in FIG. 8 is modified in the embodiment of FIGS. 12 and 13 by eliminating the attachment prongs 144 and implementing a elongate groove 230 and recess 232 combination in opposed lateral ends 234 of the cartridge 106. Each elongate groove 230 extends transversely in a front-to-back direction across one of the lateral ends 234 of the cartridge 106 and has a forward portion 236 terminating at the recess 232. The recess 232 is generally V-shaped in cross-section and has an increased depth over the elongate groove 230. This configuration facilitates the seating of the locking pin 228 within the recess 232 to secure the cartridge 106 with the frame 104.

Figure 13:
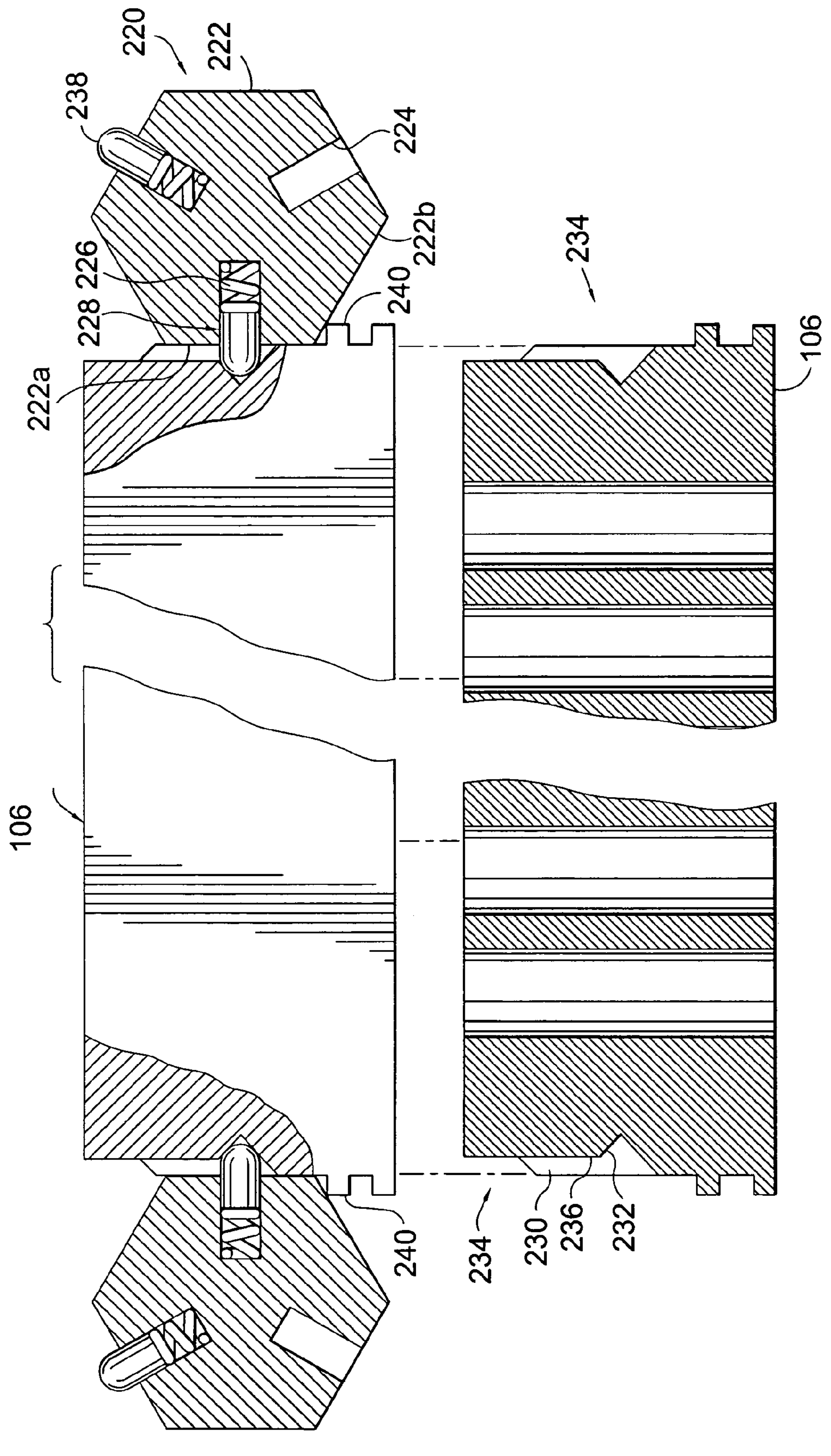
FIG. 13 is a horizontal cross-sectional view taken along line 13-13 of FIG. 12 showing the mounting of a cartridge with a set of rails.

To mount one cartridge 106 with the frame 104, the cartridge is moved horizontally towards the frame 104 and to a position between adjacent rails 220 so that the lateral ends 234 of the cartridge 106 are immediately adjacent to aligned faces 222*a* of the rails 220 and the locking pins 228 of the aligned faces 222*a* are vertically aligned with the elongate grooves 230 of the cartridge 106. Continued horizontal movement causes the locking pins 228 to slide into the elongate grooves 230 and extend into the recesses 232 by the force of the compressed spring 226. At this point, a rounded end 238 of each locking pin 228 engages with the recess 232 to maintain the position of the cartridge 106 in place on the rails 220, as seen in FIG. 13. Removal of the cartridge 106 from mounting with the rails 220 is achieved by pulling of the cartridge 106 horizontally in the opposite direction from the direction of mounting. The rounded end 238 of each locking pin 228 enables the recess 232 to produce a force component directed inwardly into the bore 224 upon pulling of the cartridge 106. This force component causes the spring 226 to compress and the locking pin 228 to retract a sufficient distance into the bore 224 to allow the pin rounded end 238 to slip out of the recess 232 and into the elongate groove 230. Continued movement of the cartridge 106 from the rails 220 forces the locking pin 228 to slide along the elongate groove 230 and eventually disengage from the cartridge 106.

A pair of anti-rocking ribs 240 are formed onto the lateral ends 234 of the cartridges 106. Each rib 240 extends vertically along one of the lateral ends 234 at a position forwardly of the recess 232. When the cartridge 106 is mounted onto the rails 220, the ribs 240 contact a second set of faces 222*b* of the rails 220. In this way, the ribs 240 prevent rotation of the cartridge 106 about an axis aligned with the bores 224 of the aligned faces 222*a* to which the cartridge 106 is mounted.

Figure 12:
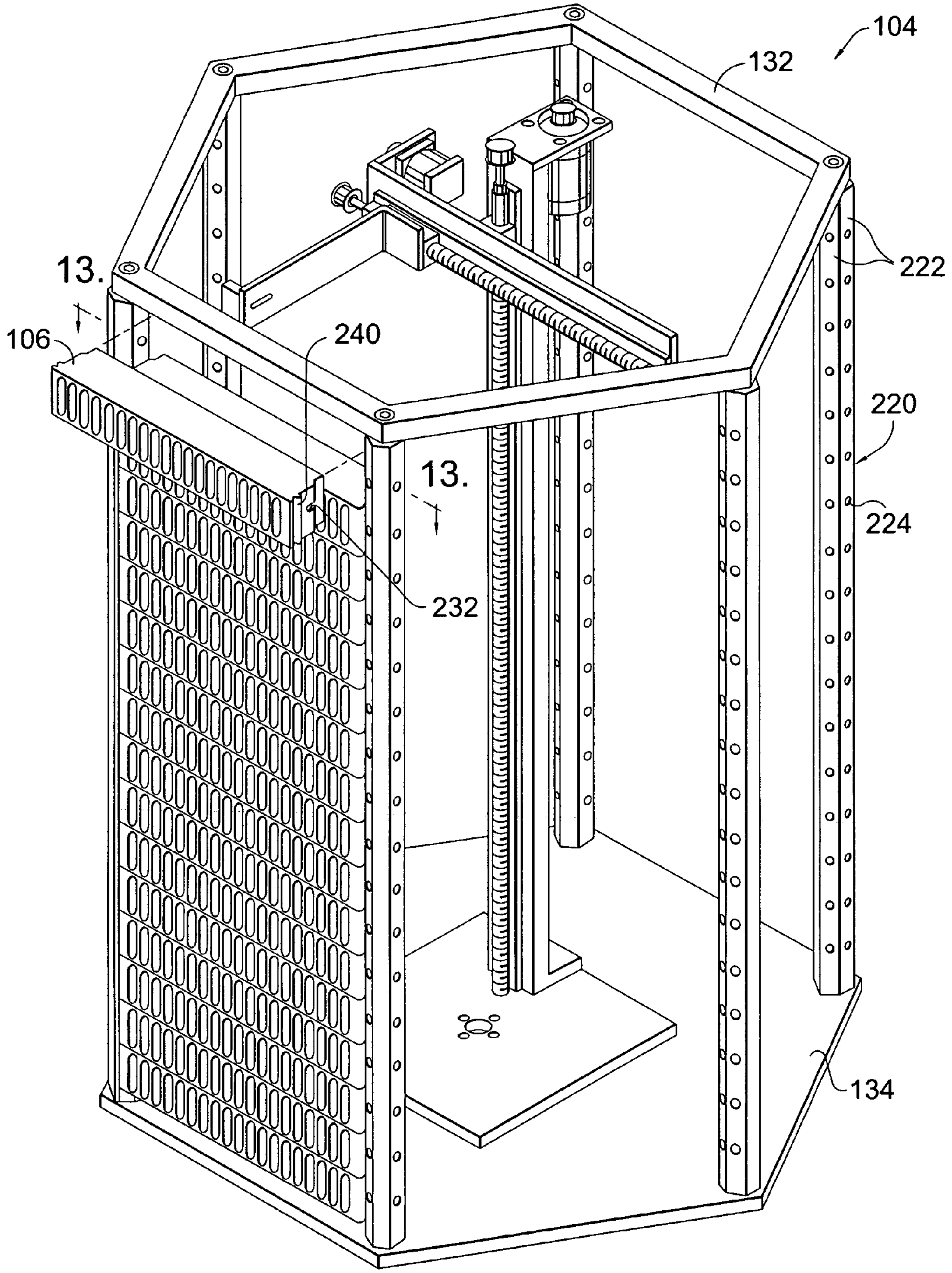
FIG. 12 is a perspective view of still another embodiment of the automated unit-based medication dispenser with the enclosure removed.

As can be appreciated, the frame configuration depicted in FIGS. 12 and 13 eliminate the need for the panel sections 114 and may be implemented with the single effector 126 illustrated in FIGS. 1-9 or the plurality of effectors 426 illustrated in FIG. 11.

Therefore, the various embodiments of the unit-based medication dispenser of the present invention enable desired unit-doses of particular drugs/medications to be selected and dispensed by an automated process, reducing the potential for human error. Furthermore, each dispensing event may be registered by the electronics orchestrating the movement device activity, or by a person removing prepackaged unit-based medications from the dispenser and scanning the bar code or other identification markings on the packaging. Since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

What is claimed is:

1. An automated unit-based medication dispensing apparatus, comprising:

a frame;

at least one cartridge having a body and a plurality of slots extending through the body, (1) wherein the slots are sized for holding unit-based doses of medications, (2) wherein the at least one cartridge includes a prong that releasably inserts into a receiving hole of the frame, the prong and the receiving hole cooperating to secure the at least one cartridge to the frame, (3) wherein the at least one cartridge includes a boss that fits into a mating recess of the frame, the boss for ensuring that a proper unit-based dose of medication is pushed out of a respective slot, and (4) wherein the at least one cartridge comprises pre-loaded unit-based doses of medication that are loaded in the at least one cartridge prior to the at least one cartridge being mounted to the apparatus; and a device positionable relative to the at least one cartridge for inducing movement of an identified at least one of the unit-based doses of medications from a slot preselected from the plurality of slots of one cartridge.

2. The apparatus of claim 1, wherein the at least one cartridge is adapted for releasable mounting with the frame such that the device induces movement of the identified at least one of the unit-based doses of medications from the slot preselected from the plurality of slots of one cartridge when the cartridge is mounted with the frame.

3. The apparatus of claim 2, wherein the frame is positioned to at least partially surround the device inducing medication movement, and wherein the at least one cartridge comprises a plurality of cartridges.

4. The apparatus of claim 3, wherein the frame includes a set of vertically extending rails, and wherein each cartridge of the plurality of cartridges is releasably mountable between adjacent rails of the set of rails.

5. The apparatus of claim 4, wherein each rail of the set of vertically extending rails has a plurality of faces, and wherein each cartridge of the plurality of cartridges has opposed lateral ends adapted to abut the faces of the set of rails.

6. The apparatus of claim 5, wherein the set of vertically extending rails have biased pin members each mating with a recess formed on each lateral end of the plurality of cartridges to mount the cartridges with the rails.

7. The apparatus of claim 3, wherein the frame includes a base, one of the device inducing medication movement and the base being rotatable to facilitate positioning of the device inducing medication movement relative to the plurality of cartridges, thereby enabling movement of the identified at least one of the unit-based doses of medication from the preselected slot of one cartridge.

8. The apparatus of claim 7, further comprising:

a turntable motor positioned below the base and rotatably coupled with the base; and electronic controls connected with the turntable motor for receiving an input regarding the identified at least one of the unit-based doses of medication to be dispensed and generating a command signal to cause the turntable motor to position the cartridge of the plurality of cartridges mounted with the frame that has the preselected slot housing the identified at least one of the unit-based doses of medication such that the t device can induce movement of the identified at least one of the unit-based doses of medication from the preselected slot.

9. The apparatus of claim 8, wherein the device inducing medication movement includes:

an effector; and at least one motor for positioning the effector adjacent to the preselected slot housing the identified at least one of the unit-based doses of medication;

wherein the electronic controls are connected with the motor and generate additional command signals to direct effector positioning.

10. The apparatus of claim 9, wherein the effector utilizes air pressure to impart a force on the identified at least one of the unit-based doses of medication to be moved from the preselected slot holding the identified at least one of the unit-based doses of medication.

11. The apparatus of claim 9, wherein the plurality of slots of the at least one cartridge of the plurality of cartridges are arranged in a pattern, and wherein the at least one motor includes an x-y motor system for positioning of the effector adjacent to the preselected slot in the pattern that houses the identified at least one of the unit-based doses of medication.

12. The apparatus of claim 1, wherein the device inducing medication movement includes:

at least one effector; and at least one motor for positioning the at least one effector adjacent to the preselected slot housing the identified at least one of the unit-based doses of medication.

13. The apparatus of claim 12, further comprising electronic controls connected with the at least one motor for receiving an input regarding the identified at least one of the unit-based doses of medication to be dispensed and generating a command signal directing positioning of the at least one effector by the at least one motor in accordance with the input received.

14. The apparatus of claim 12, wherein the at least one effector includes a plurality of effectors mounted onto a support, and the at least one motor moves the support along an axis to position one effector of the plurality of effectors adjacent to the preselected slot housing the identified at least one of the unit-based doses of medication.

15. The apparatus of claim 1, wherein the device inducing medication movement includes:

an effector;

a first motor;

a first support driven by the first motor and onto which the effector is mounted;

a second motor;

a second support driven by the second motor and onto which the first support and the first motor are mounted, wherein the first motor moves the effector in a first dimension and the second motor moves the effector in a second dimension to position the effector adjacent to the preselected slot of one cartridge housing the identified at least one of the unit-based doses of medication to be moved from the preselected slot.

16. The apparatus of claim 1, wherein the device inducing medication movement includes:

a plurality of effectors laterally adjacent to one another;

a first support onto which the plurality of effectors are mounted; and a motor driving movement of the first support to position at least one of the plurality of effectors in alignment with the preselected slot housing the at least one of the unit-based doses of medication to be moved from the preselected slot.

17. The apparatus of claim 1, further comprising an enclosure surrounding the at least one cartridge and the device inducing medication movement, the enclosure having an access opening for retrieval of the at least one of the unit-based doses of medications moved from the preselected slot.

18. The apparatus of claim 17, further comprising a refrigeration unit for providing refrigeration within the enclosure.

19. An automated apparatus for dispensing unit-based clinical items, comprising:

a vertically extending panel that has a front side and a back side and that has a plurality of panel slots;

a container that has a front side and a back side and that has a plurality of container slots, each slot of the plurality of container slots sized to hold unit based clinical items, (1) wherein the container is adapted for releasable attachment to the vertically extending panel, such that the back side of the container abuts the front side of the vertically extending panel; and (2) wherein when the container is releasably attached to the vertically extending panel the plurality of panel slots are aligned with the plurality of container slots;

a movement device positioned in front of the back side of the vertically extending panel, such that the vertically extending panel is positioned between the movement device and the container, wherein the movement device is positionable relative to the plurality of panel slots in order to induce movement of a selected unit-based clinical item out of one of the plurality of container slots to dispense the selected unit-based clinical item, the movement device including:

an effector; and at least one motor coupled with the effector for positioning of the effector adjacent to one of the plurality of slots in which is disposed the selected unit-based clinical item to be dispensed.

20. The apparatus of claim 19, wherein the effector utilizes air pressure to impart a force on the selected unit-based clinical item to be dispensed.

21. The apparatus of claim 19, wherein the grid pattern of the plurality of slots forms a set of rows and columns of slots, the at least one motor including a motor system for positioning of the effector adjacent to the particular slot position holding the selected unit-based clinical item.

22. The apparatus of claim 21, further comprising electronic controls connected with the motor system for receiving an input regarding an identification of the selected unit-based clinical item to be dispensed and generating a command signal directing positioning of the effector by the motor system in accordance with the input received.

23. The apparatus of claim 21, further comprising a frame at least partially surrounding the movement device, wherein one of the movement device and the frame is rotatable to facilitate positioning of the movement device relative to the container holding the selected unit-based clinical item when mounted with the frame.

24. The apparatus of claim 23, further comprising:

a turntable motor rotatably coupled with one of the frame and the movement device, wherein the turntable motor is adapted to rotationally align the effector of the movement device with the container holding the selected unit-based clinical item and the motor system is adapted to linearly align the effector with the specific slot of the plurality of slots in which the selected unit-based clinical item is disposed.

25. The apparatus of claim 19, wherein the movement device further comprises a plurality of additional effectors positioned laterally adjacent to one another, the at least one motor moving the effectors together to position at least one of the effectors in alignment with the specific slot of the plurality of slots in which the selected unit-based clinical item is disposed.

* * * * *